United States Patent [19]

Riese

[11] Patent Number: 4,766,854

[45] Date of Patent: Aug. 30, 1988

[54] EXHAUST VALVE THROTTLING MECHANISM FOR TWO-STROKE ENGINE

[75] Inventor: Stephen B. Riese, Fond du Lac, Wis.

[73] Assignee: Brunswick Corporation, Skokie, Ill.

[21] Appl. No.: 64,195

[22] Filed: Jun. 19, 1987

[51] Int. Cl.[4] .............. F02B 75/02

[52] U.S. Cl. .............. 123/65 PE

[58] Field of Search .......... 123/65 PE, 65 V, 65 EM, 123/73 SC, 52 M, 190 R

[56] References Cited

U.S. PATENT DOCUMENTS

| | | | |
|---|---|---|---|
| 2,164,167 | 6/1939 | Schneider | 123/65 V |
| 2,403,844 | 7/1946 | Bolli | 123/65 V |
| 2,798,466 | 7/1957 | Rzepecki | 123/65 V |
| 3,367,311 | 2/1968 | Tenney | 123/65 |
| 4,121,552 | 10/1978 | Mithuo et al. | 123/65 |
| 4,187,809 | 2/1980 | Lanpheer et al. | 123/65 |
| 4,285,311 | 8/1981 | Iio | 123/323 |
| 4,321,893 | 3/1982 | Yamamoto | 123/65 |
| 4,325,335 | 4/1982 | Shibata | 123/323 |
| 4,333,431 | 6/1982 | Iio et al. | 123/323 |
| 4,341,188 | 7/1982 | Nerstrom | 123/324 |
| 4,364,346 | 12/1982 | Shiohara | 123/323 |
| 4,368,703 | 1/1983 | Shibata | 123/65 |
| 4,388,894 | 6/1983 | Tanaka et al. | 123/65 |
| 4,397,272 | 8/1983 | Omote | 123/179 |
| 4,516,540 | 5/1985 | Nerstrom | 123/65 |
| 4,570,439 | 2/1986 | Uchinishi | 60/314 |
| 4,621,596 | 11/1986 | Uchinishi | 123/65 |
| 4,622,928 | 11/1986 | Uchinishi | 123/65 |

FOREIGN PATENT DOCUMENTS

| | | | |
|---|---|---|---|
| 914498 | 10/1946 | France | 123/65 V |
| 842337 | 7/1960 | United Kingdom | 123/65 BA |

OTHER PUBLICATIONS

SAE Technical Paper Series, "Emission Control of Two-Stroke Motorcycle Engines By The Butterfly Exhaust Valve", Tsuchiya et al., Sep. 8-11, 1980.

*Primary Examiner*—Charles J. Myhre
*Assistant Examiner*—David A. Okonsky
*Attorney, Agent, or Firm*—Andrus, Sceales, Starke & Sawall

[57] ABSTRACT

An exhaust port throttling mechanism for a two-stroke engine. The engine includes a plurality of in-line cylinders each having exhaust port means disposed to be closed during reciprocating movement of the piston. The engine block is provided with a passage which intersects each exhaust port means, and a shaft is mounted for rotation within the passage and carries a plurality of butterfly-type valves that are disposed to open and close each exhaust port means. When used with a V-6 engine, having two banks of in-line cylinders, a shaft carrying the valves is employed for each bank and the corresponding ends of the shafts are interconnected by meshing gear segments. One of the gear segments is connected through a linkage to the throttle lever for the engine, so that the valves will be moved by actuation of the throttle lever between a substantially closed position at low speeds to an open position at high speeds. A biasing mechanism is incorporated with the gear segments to bias the valves to a closed position, and an adjusting mechanism can be incorporated to manually adjust the closed position of the valves.

14 Claims, 2 Drawing Sheets

EXHAUST VALVE THROTTLING MECHANISM FOR TWO-STROKE ENGINE

BACKGROUND OF THE INVENTION

Two-stroke engines include an exhaust port in the cylinder wall, which is opened and closed as the piston reciprocates in the cylinder. It has been recognized that in multiple cylinder two-stroke engines reflected pressure fluctuations under idle or low speed conditions can adversely effect the combustion. At lcw or idle speeds, the pressure waves are not normally tuned so that reflected pressure waves from other cylinders in the bank, or from the same cylinder, can have an adverse effect on the engine combustion.

In view of this, it has also been proposed to utilize a butterfly valve in the exhaust port of a two-stroke motorcycle engine and control the operation of the valve through the intake manifold vacuum as disclosed in "Emission Control Of Two-Stroke Motor Cycle Engines By The Butterfly Exhaust Valve", *Society Of Automotive Engineers Inc.,* Sept. 8–11, 1980.

SUMMARY OF THE INVENTION

The invention is directed to an exhaust valve throttling mechanism for a two-stroke engine and in particular to an exhaust valve throttling mechanism that can be incorporated with multiple cylinder engine, such as a V-6 marine engine employing two banks of three in-line cylinders. In accordance with the invention, the engine block is provided with a pair of openings or passages each of which intersects the exhaust ports of a bank of cylinders. A shaft is mounted for rotation within each passage and carries a plurality cf shutters or valve members, each of which is mounted within one of the exhaust ports.

Corresponding ends of the shafts carry mating gear segments and one of the gear segments is connected through a linkage to the throttle lever of the engine.

With this construction, advancement of the throttle will operate through the linkage to rotate the gear segments and correspondingly rotate the shafts to move the valves toward the open position. Conversely, a reduction of engine speed through operation of the engine throttle lever will move the valve members toward the closed position where the valve members will act to substantially block or restrict the propagation of pressure waves back to the cylinders at low and idle speeds.

A biasing mechanism is incorporated with each shaft, and acts to urge the valve members to a closed position so that the valve members will automatically be returned to the closed position on termination of operation of the engine. In addition, an adjusting mechanism can be incorporated with at least one of the gear segments to adjust the closed position of the valves.

The exhaust valve throttling mechanism of the invention substantially improves the performance of the engine by providing quieter operation, better fuel economy and smoother running at low speeds. In addition, the mechanism system decreases hydrocarbon emissions and reduces engine surge that results from the irregular combustion inherent in a two-stroke engine.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENTS

Figure 1:
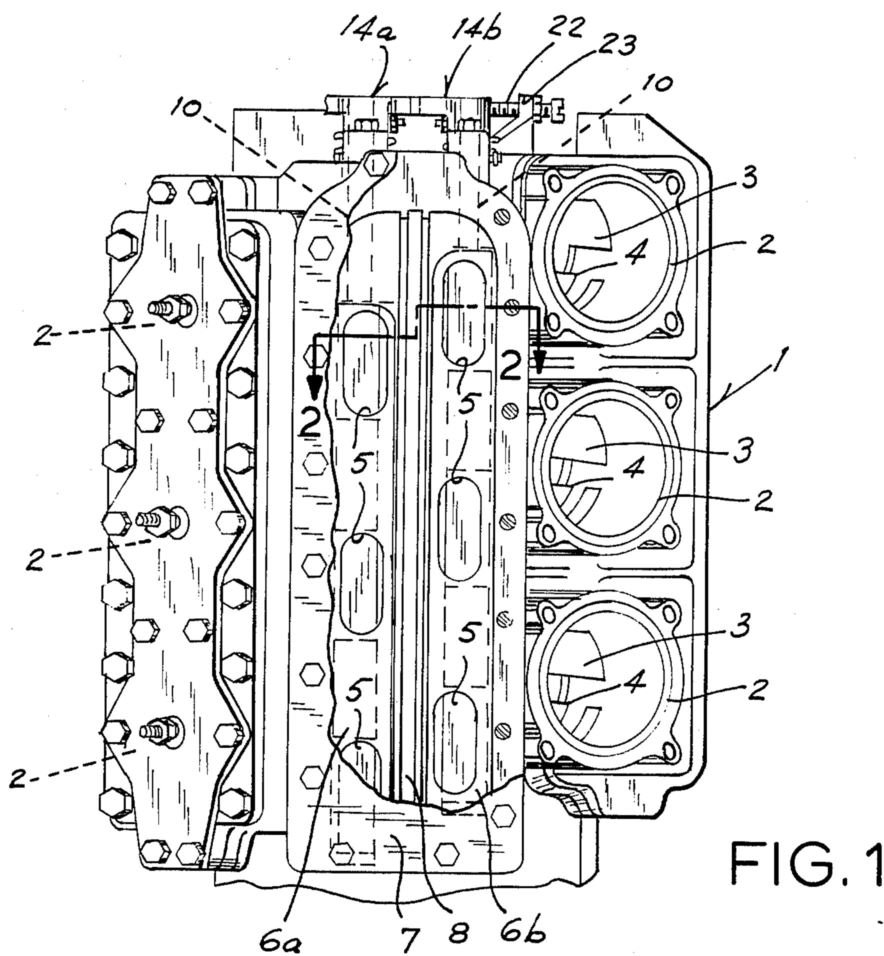
FIG. 1 is an elevational view partly in section of a six cylinder outboard motor engine incorporating the exhaust valve throttling system of the invention.
Figure 2:
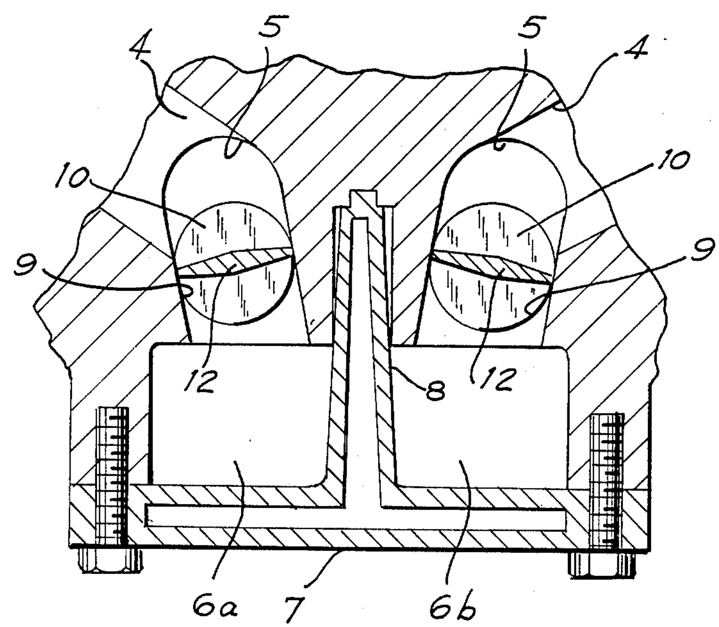
FIG. 2 is a section taken along line 2—2 of FIG. 1.

The drawings illustrate a portion of an outboard motor powerhead having a two-stroke, six cylinder engine, such as that disclosed in U.S. Pat. No. 4,187,809. The engine block 1 is provided with two banks of three cylinders 2 in a vertical in-line arrangement. Each of the cylinders 2 includes an air-fuel intake port 3 and an exhaust port 4. As best shown in FIG. 2, each exhaust port 4 communicates with an exhaust passage 5 and the exhaust passages 5 of each of the banks of cylinders 2 register with exhaust chambers *6a* and *6b*. A cover assembly 7 is connected to the engine block and encloses the exhaust chambers *6a* and *6b*, while an exhaust cavity separator 8, that is formed integrally with cover assembly 7 separates the two chambers.

In accordance with the invention, engine block 1 is provided with a pair of parallel openings or passages 9, each of which intersects the exhaust passages 5 of one of the cylinder banks. A shaft 10 is mounted within each of the openings 9, and each shaft 10 includes a plurality of spaced collars 11 which serve as bearing means to journal the shaft 10 within the respective passage 9. Located between collars 11 on each shaft are three valve members or shutters 12, which are disposed in the respective exhaust passages 5. Through rotation of shaft 10, the valve members 12 can be moved between closed and open positions.

Figure 3:
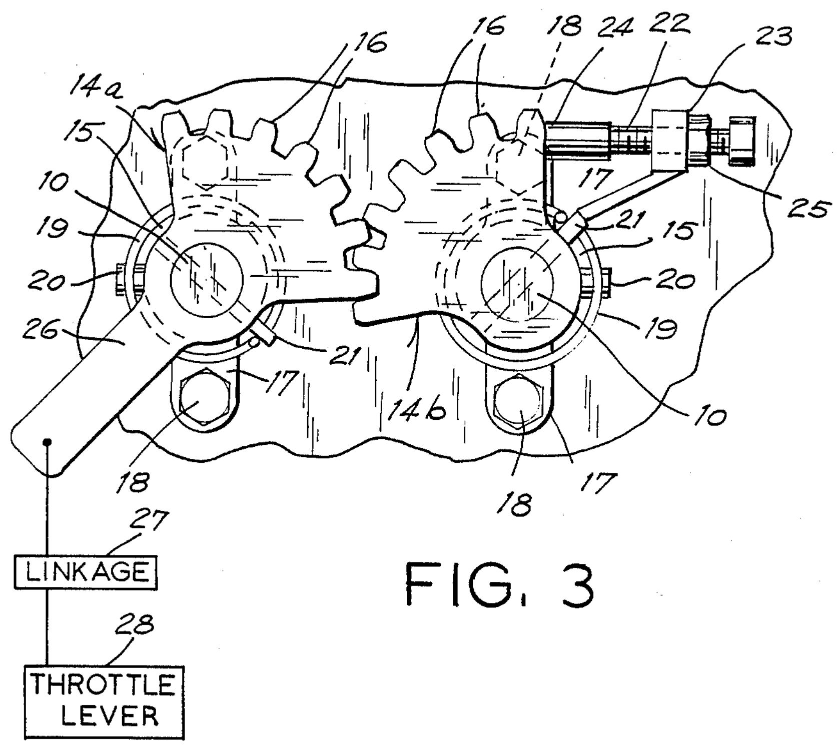
FIG. 3 is a top plan view showing the mating gear segments.
Figure 4:
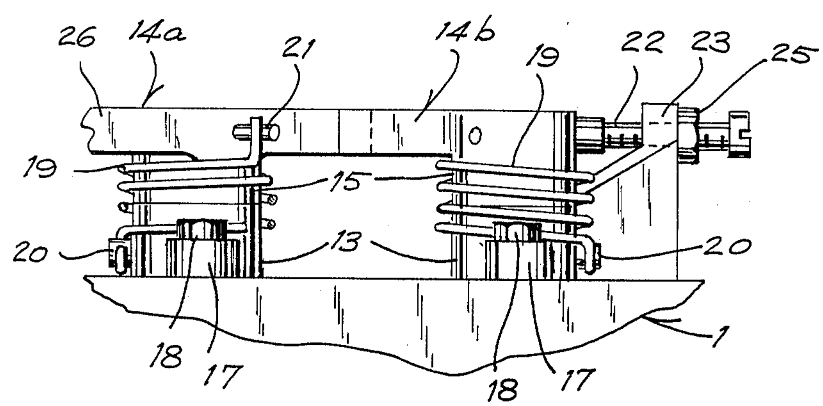
FIG. 4 is an enlarged fragmentary elevational view showing the gear segments and the biasing mechanism.
Figure 5:
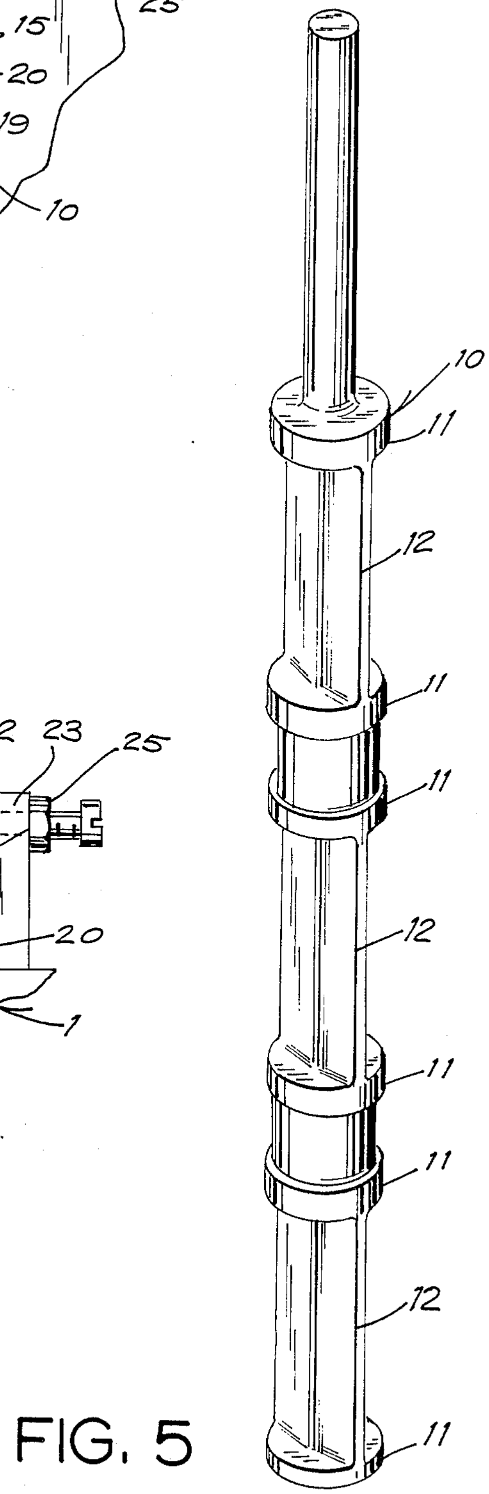
FIG. 5 is a perspective view of one of the shafts carrying the valve members.

The upper end of each shaft 10 extends through a collar or boss 13 on block 1 and carries a gear segment 14. As best shown in FIG. 3, the gear segments *14a* and *14b* each include a central hub 15, which is mounted on the end of the corresponding shaft 10, and a plurality of meshing gear teeth 16.

Arms 17 extend outwardly from opposite sides of each hub 15 and are connected to block 1 through bolts 18.

Valve members 12 are biased to a closed position and to provide this biasing action, a torsion spring 19 is disposed around each of the hubs 15. One end of each torsion spring is engaged with a lug 20 on boss 13, while the opposite end of the torsion spring is engaged with a pin 21 on the respective gear segment. The force of torsion springs 19 will thus bias the gear segments 14 and shafts 10 in a direction such that on termination of operation of the engine the valve members will be returned to the closed position.

The invention also includes a mechanism for adjusting the closed position of valve members 12. In this regard, an adjusting screw 22 is threaded within a bracket 23 that extends upwardly from block 1 and the end 24 of screw 22 is engaged with the peripheral edge of gear segment **14*b*. Lock nut 25 is threaded onto screw 22 and bears against bracket 23. By adjustment of screw 22, the closed position of the valve members 12 in exhaust passages 5 can be controlled to obtain the optimum exhaust opening. In practice, valve members 12 will not be fully closed at idle speed and adjusting screw 22 can be employed to adjust the amount of opening of the valve when in the closed position. Alternately, the valve members 12** can be provided with one or more small holes or cut-outs, in which case the valve members can be moved to a fully closed position and the holes will provide for the discharge of exhaust at idle conditions. Thus, the term "closed position" as used in the description and claims is intended to cover a condition where the valve members do not completely close off the exhaust passages.

Valve members 12 are moved between the closed and open positions in accordance with operation of the engine throttle. To provide this operation, an arm 26 extends outwardly from the hub 15 of gear segment **14*b* and the arm is connected through a suitable linkage 27 to the throttle lever 28 for the outboard engine. As the throttle lever 28 is advanced toward full engine speed, the valve members 12 will be moved toward the open position, against the force of torsion springs 19**, and conversely, as the throttle lever is moved toward idle speed, the valve members will be moved toward the closed position so that the valve members will substantially block the reflection of pressure waves back to the cylinders.

Linkage 27 and throttle lever 28 are shown diagrammatically and may take various forms depending upon the nature and location of the throttle of the marine craft. In general, the movement of the valve members 12 is proportional to movement of the throttle lever 28 and can be calibrated for each type of engine.

The invention provides a simple and effective exhaust valve throttling mechanism for engines incorporating a plurality of in-line cylinders. While the above description has shown the mechanism as utilized with a V-6 engine employing two banks of three cylinders each, it is contemplated that the invention can be used with any engine having a plurality of inline cylinders.

The exhaust valve throttling mechanism, by preventing the propagation of pressure fluctuated back to the cylinders, substantially improves engine performance, producing a quieter and smoother running engine at low speeds, as well as increasing fuel economy and reducing engine surge. In addition, the mechanism substantially reduces hydrocarbon emissions from the engine.

Various modes of carrying out the invention are contemplated as being within the scope of the following claims particularly pointing out and distinctly claiming the subject matter which is regarded as the invention.

I claim:

1. In a two-stroke engine, an engine block having a plurality of in-line cylinders, piston means disposed for reciprocal movement in each cylinder, each cylinder including exhaust port means disposed to be closed by said piston means, said block including a passage intersecting each of said exhaust port means, and exhaust port throttling means including a shaft journalled for rotation within said passage, a plurality of valve members disposed in spaced relation on said shaft, each valve member disposed in registry with one of said exhaust port means, each valve member being movable between a closed position where said valve member substantially closes off the respective exhaust port means and an open position, and operating means for rotating said shaft in accordance with a variation in engine speed to move said valve members from said closed position at low throttle speed to said open position at high throttle speed, said valve members when in said closed position at low speed acting to restrict the propagation of pressure waves to the cylinders.

2. The engine of claim 1, and including adjusting means for adjusting the position of said valve members when in the closed position.

3. The engine of claim 1, wherein said block, includes three in-line cylinders.

4. In a two-stroke engine, an engine block including two banks of in-line cylinders, each bank comprising at least two cylinders, piston means disposed for reciprocating movement in each cylinder, each cylinder having exhaust port means disposed to be closed by said piston means, said block including a pair of generally parallel passages, each passage intersecting the exhaust port means of one of said banks of cylinders, a shaft journalled for rotation within each passage, a plurality of valve members disposed in spaced relation on each shaft, each valve member disposed in registry with an exhaust port means, throttle means for said engine, and operating means for operably interconnecting said shafts with said throttle means for simultaneously rotating said shafts to move said valve members in unison from a substantially closed position at low throttle speed to an open position at high throttle speed, said valve members when in said closed position at low speed acting to restrict the propagation of pressure waves to the cylinders.

5. The engine of claim 4, wherein said operating means comprises connecting means interconnecting said shafts, and linkage means interconnecting said throttle means and said connecting means.

6. The engine of claim 4, wherein each valve member comprises a generally flat shutter configured to complement the cross sectional area of said exhaust port means.

7. The engine of claim 1, and including bearing means on said shaft between said valve members for journalling said shaft for rotation.

8. The engine of claim 5, wherein said connecting means comprises a gear segment mounted on each shaft, said gear segments being disposed in meshing engagement, said linkage means being operably connected to one of said gear segments.

9. The engine of claim 8, and including adjusting means for simultaneously adjusting the position of said valve members when in the closed position.

10. The engine of claim 9, wherein said adjusting means comprises adjustable stop means mounted for movement relative to said block, and abutment means carried by at least one of said shafts and disposed to engage said stop means, engagement of said abutment means with said stop means determining the closed position of said valve members.

11. The engine of claim 8, and including biasing means for biasing said valve members to said closed position.

12. The engine of claim 11, wherein said biasing means comprises a biasing member interconnecting each shaft with said block for urging each shaft in a direction to move the corresponding valve member to said closed position.

13. In a two-stroke six cylinder engine, an engine block including two banks of three in-line cylinders, piston means disposed for reciprocating movement in each cylinder, each cylinder having exhaust port means disposed to be closed by said piston means, said block including a pair of generally parallel passages, each passage intersecting the exhaust port means of one of said banks of cylinders, a shaft journalled for rotation within each passage, a plurality of valve members disposed in spaced relation on each shaft, each valve member disposed in registry with an exhaust port means, each valve member comprises a generally flat shutter configured to complement the cross sectional area of said exhuast port means, gear means secured to each shaft, said gear means being in meshing engagement, and means responsive to the speed of said engine for rotating said gear means to thereby rotate said shafts in unison to move said valve members between a closed position at idle engine speed to an open position at full engine speed.

14. In a two-stroke engine, an engine block having a plurality of in-line cylinders, piston means disposed for reciprocal movement in each cylinder, each cylinder including exhaust port means disposed to be closed by said piston means, said block including a passage intersecting each of said exhaust port means, throttle means for controlling the speed of the engine and movable between a high speed position and an idle speed position, and means responsive to movement of said throttle means toward said idle speed position for blocking the propagation of reflected pressure waves through each exhaust port means to the respective cylinder.

* * * * *